United States Patent
Dow et al.

(10) Patent No.: US 10,031,625 B2
(45) Date of Patent: Jul. 24, 2018

(54) COMPUTER DEVICE IMPLEMENTED AUDIO TRIANGULATION

(71) Applicant: International Business Machines Corporation, Armonk, NY (US)

(72) Inventors: Eli M. Dow, Wappingers Falls, NY (US); James P. Gilchrist, Milford, CT (US); Steven K. Schmidt, Hinesburg, VT (US); Charles J. Stocker, IV, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 14/945,942

(22) Filed: Nov. 19, 2015

(65) Prior Publication Data

US 2017/0083125 A1  Mar. 23, 2017

Related U.S. Application Data

(63) Continuation of application No. 14/859,563, filed on Sep. 21, 2015.

(51) Int. Cl.
*G06F 3/043* (2006.01)
*G06F 3/041* (2006.01)

(52) U.S. Cl.
CPC ............ *G06F 3/043* (2013.01); *G06F 3/0416* (2013.01)

(58) Field of Classification Search
CPC ................................ G06F 3/043; G06F 3/0416
See application file for complete search history.

(56) References Cited

U.S. PATENT DOCUMENTS

| 5,686,942 A | 11/1997 | Ball | |
| 2006/0192763 A1 | 8/2006 | Ziemkowski | |
| 2009/0207131 A1* | 8/2009 | Togami | G06F 3/0416 345/156 |
| 2011/0037734 A1 | 2/2011 | Pance et al. | |
| 2013/0053053 A1* | 2/2013 | Agarwal | G01S 19/48 455/456.1 |
| 2013/0226444 A1* | 8/2013 | Johansson | G06F 3/0488 701/300 |
| 2015/0268730 A1* | 9/2015 | Walline | G06F 3/017 345/168 |
| 2016/0150575 A1* | 5/2016 | Andersen | H04W 76/02 370/329 |
| 2016/0209390 A1* | 7/2016 | Overcast | G01N 33/227 |

(Continued)

OTHER PUBLICATIONS

Appendix P—List of Patents of Patent Applications Treated as Related, Filed Nov. 19, 2015, 2 pages.

(Continued)

*Primary Examiner* — Ryan A Lubit
(74) *Attorney, Agent, or Firm* — Andrew Aubert; David B. Woycechowsky (57) ABSTRACT

An audio touchscreen system receives microphone location data respectively corresponding to a plurality of microphones. Sonic signals corresponding to a sonic event respectively transduced by each microphone is triangulated, to determine the location of the origin of the sonic event upon the audio touchscreen, based on the sonic signals and the microphone location data. User input data is generated based on the location of the sonic event as determined by the triangulation.

15 Claims, 5 Drawing Sheets

(56) References Cited

U.S. PATENT DOCUMENTS

2016/0341813 A1* 11/2016 Ware .................. G01S 5/22
2016/0349722 A1* 12/2016 On .................... G05B 15/02

OTHER PUBLICATIONS

Banerji et al., "Sound Source Triangulation Game", provided in search report dated Apr. 11, 2013, downloaded from the internet on Apr. 19, 2013, <people.ece.cornell.edu/land/courses/ece4760/FinalProjects/s2007/sp369_bb226/sp369_bb226/>, pp. 1-36.
Dow et al., "Audio Touchscreen", U.S. Appl. No. 14/859,563, filed Sep. 21, 2015.
Paradiso et al., "Passive Acoustic Sensing for Tracking Knocks Atop Large Interactive Displays", Presented at the IEEE Sensors 2002 Conference, Hyatt Orlando, Kissimmee, Florida USA, Jun. 12-14, 2002, pp. 1-6.
Purcher, Jack, "Google in Race with Apple to Bring Backside Controls to Devices", Mar. 8, 2013, 5 pages, <http://www.patentlyapple.com/patently-apple/2013/03/google-in-race-with-apple-to-bring-backside-controls-to-devices.html>.

* cited by examiner

COMPUTER DEVICE IMPLEMENTED AUDIO TRIANGULATION

BACKGROUND

The present invention relates generally to the field of touchscreen user input devices for computers ("touchscreens"), and more particularly to touchscreens that use audio input data ("audio touchscreens").

In some audio touchscreens, user input signals are generated by sound-to-signal transducers (herein called "microphones") in response to a physical tap or sound-producing physical interaction (herein sometimes called a "sonic event") against a surface (herein called an "audio touchscreen" or a "virtual touchscreen"). These user input signals are processed to determine the location, on the audio touchscreen, of the origination of the sound. Because the sound source can be located with respect to the audio touchscreen, different locations on the audio touchscreen can be used to receive different user input. A simple example of this is when the audio touchscreen is divided into areas corresponding to keys on a keyboard, and the user taps the "keys" on the audio touchscreen to enter user input in the form of alphanumeric characters.

Wikipedia (http://en.wikipedia.org/wiki/Wireless_ad_hoc_network, as of 11 Jun. 2015) discloses as follows: "A wireless ad hoc network (WANET) is a decentralized type of wireless network. The network is ad hoc because it does not rely on a pre-existing infrastructure, such as routers in wired networks or access points in managed (infrastructure) wireless networks. Instead, each node participates in routing by forwarding data for other nodes, so the determination of which nodes forward data is made dynamically on the basis of network connectivity. In addition to the classic routing, ad hoc networks can use flooding for forwarding data . . . . Wireless mobile ad hoc networks are self-configuring, dynamic networks in which nodes are free to move."

SUMMARY

According to an aspect of the present invention, there is a method, computer program product and/or system that performs the following steps (not necessarily in the following order): (i) receiving, by a set of processor(s), microphone location data respectively corresponding to locations of a plurality of microphones including at least a first microphone, a second microphone and a third microphone; (ii) receiving, by the set of processor(s), a plurality of sonic signals corresponding to a sonic event respectively transduced by each microphone of the plurality of microphones, where each sonic signal includes time data providing a time of the corresponding sonic event; (iii) triangulating, by the set of processor(s), to determine a location of a source of the sonic event based, at least in part, on the plurality of sonic signals and the microphone location data; and (iv) generating, by the set of processor(s), a user input data based at least in part on the location of the sonic event as determined by the triangulation. The first computer device is operatively coupled with the first microphone. The first sonic signal is received from a first computer device. The second computer device is operatively coupled with the second microphone. The second sonic signal is received from the second computer device which is different than the first computer device.

DETAILED DESCRIPTION

Some embodiments of the present invention are directed to audio touchscreen systems with one or more of the following features: (i) audio information for locating tap sounds is provided by more than one microphone-including computer device (for example, a set of multiple smartphones and laptops each with its own microphone); (ii) the multiple microphone-including computer devices can be placed (for example, smart phones placed at the corners of a conference room table), moved and/or removed from the system independently of each other and/or independently of the location of the audio touchscreen surface; and/or (iii) an ad hoc network (sometimes called WANET) is used to communicate at least some of the audio information from the multiple microphone-including devices to a computer that performs the triangulation calculations to locate the locations of the audio touchscreen tap sounds in space.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1A:
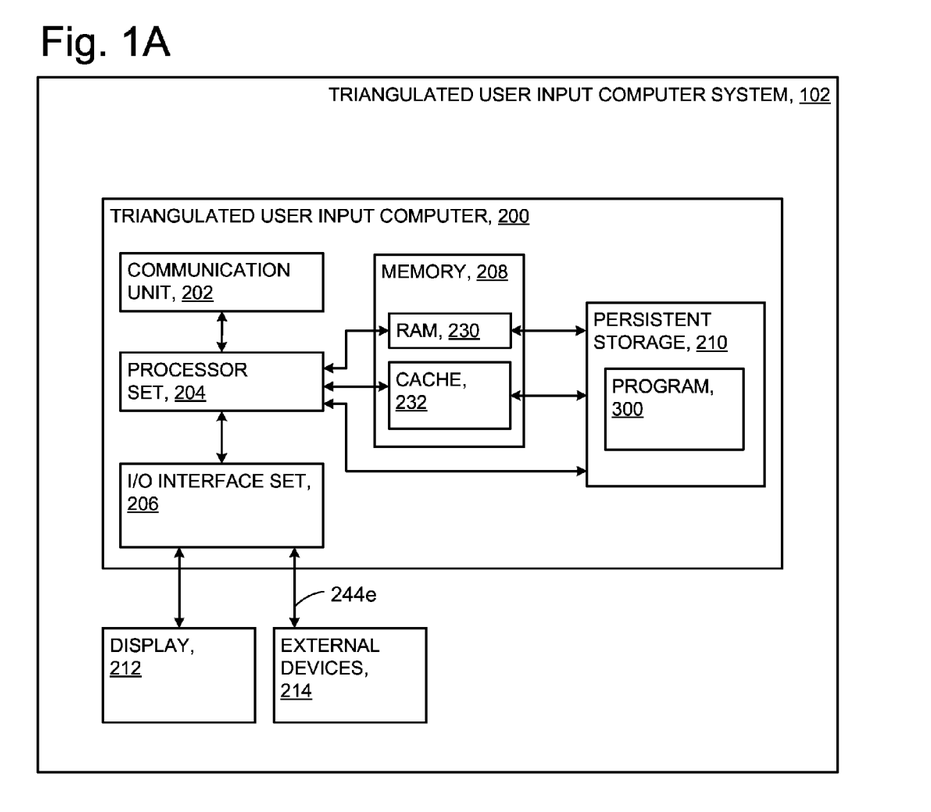
FIG. 1A is a block diagram view of a first embodiment of a system according to the present invention.
Figure 1B:
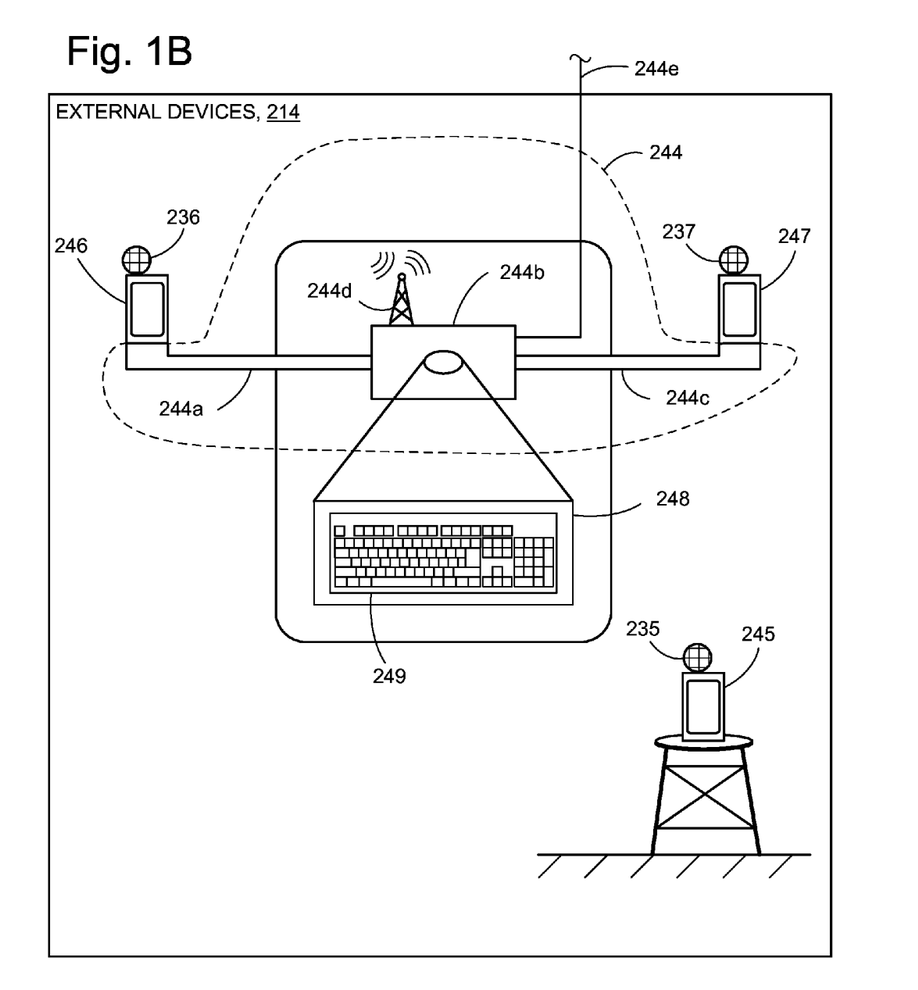
FIG. 1B shows external devices 214 of FIG. 1A in a first embodiment of a system according to the present invention.

An embodiment of a possible hardware and software environment for software and/or methods according to the present invention will now be described in detail with reference to the Figures. FIG. 1A is a functional block diagram illustrating various portions of triangulated user input computer system 102, including: triangulated user input computer 200, communication unit 202; processor set 204; input/output (I/O) interface set 206; memory device 208; persistent storage device 210; display device 212; external devices 214; random access memory (RAM) devices 230; cache memory device 232; and program 300. FIG. 1B shows external devices 214 of FIG. 1A. External devices 214 include: harnessed computer devices 246, 247 (in this embodiments, the harness devices are microphone-including smart phones); unconstrained computer device 245 (in this embodiment a smart phone that is free to be moved about); microphones 235, 236 and 237; harness device 244 (including first arm 244a, light projector 244b, second arm 244c and wireless transceiver 244d); light projection audio touchscreen 248; and tabletop 249.

Triangulated user input computer system 102 is, in many respects, representative of the various computer sub-system(s) in the present invention. Accordingly, several portions of triangulated user input computer system 102 will now be discussed in the following paragraphs.

Triangulated user input computer system 102 may be a laptop computer, tablet computer, netbook computer, personal computer (PC), a desktop computer, a personal digital assistant (PDA), a smart phone, or any programmable electronic device capable of communicating with the client sub-systems. Program 300 is a collection of machine readable instructions and/or data that is used to create, manage and control certain software functions that will be discussed in detail, below, in the Example Embodiment sub-section of this Detailed Description section.

Triangulated user input computer system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Triangulated user input computer system 102 is shown as a block diagram with many double arrows. These double arrows (no separate reference numerals) represent a communications fabric, which provides communications between various components of triangulated user input computer system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for triangulated user input computer system 102; and/or (ii) devices external to triangulated user input computer system 102 may be able to provide memory for triangulated user input computer system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to triangulated user input computer system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with triangulated user input computer 200. For example, I/O interface set 206 provides a connection to external device set 214. External device set 214 will typically include devices such as a keyboard, keypad, a touchscreen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
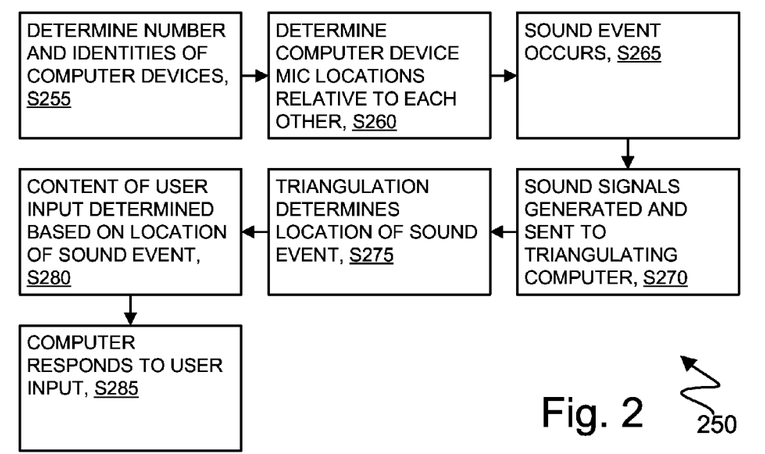
FIG. 2 is a flowchart showing a first embodiment method performed, at least in part, by the first embodiment system.
Figure 3:
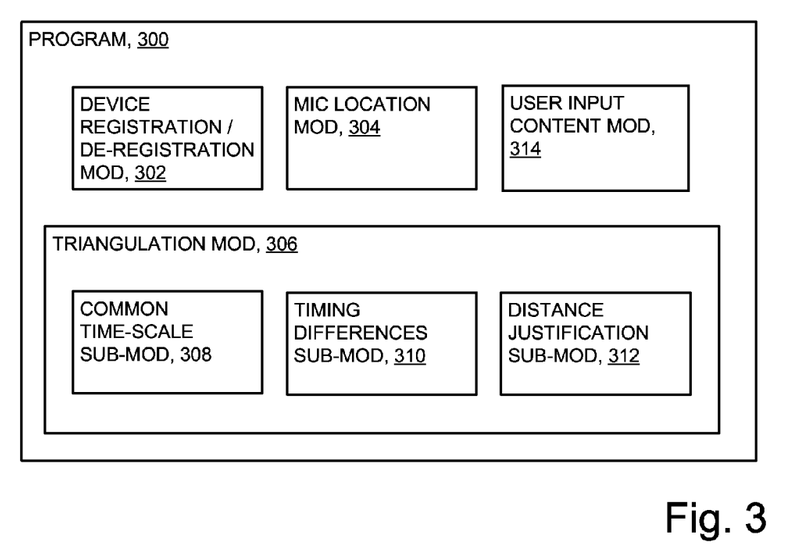
FIG. 3 is a block diagram showing a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where device registration/de-registration module ("mod") 302, of program 300 of FIG. 3, determines the number of microphone-including computer devices and identities of those devices that will participate in implementing audio touchscreen 248 (also referred to herein as virtual touchscreen 248) of FIG. 1B. In this embodiment, mod 302 sets up an ad hoc network (WANET) so that each of the microphone-including computer devices 245, 246, 247 can communicate on an ongoing basis with program 300 of triangulation computer 200 (see FIG. 1A). In this embodiment, triangulation computer 200 (roughly speaking, the computer with the processor that performs the triangulation) does not, itself, include a microphone. Alternatively, triangulation computer 200 could have one or more microphones of its own. Microphone-including computer devices 245, 246 and 247 are considered as "computer" (see definition, below) because they each have sufficient processing and data storage capability to be considered as a computer.

Microphone-including computer devices should not be confused with simple microphones. In this embodiment, it is advantageous to use computer devices (as opposed to merely using multiple microphones attached to a triangulation computer) because: (i) the microphone-including computer devices (wherein a microphone is an integral part of the computer device) can help establish the location of the microphones they respectively include (for example, by using global positioning system signals, by storing data to locate the built-in microphone relative to the housing of the microphone-including computer device); and (ii) the microphone-including computer devices can correlate their sound signals to a computer-generated clock so that the timing of the detected sound (for example, tap on tabletop 249) can be precisely established without significant communication and/or processing-driven latency.

In this document, a microphone is said to be "operatively coupled" to a device when there is direct communication of the transduced sonic signal from the microphone to the processor(s) of the device. For example, in this embodiment, microphone 236: (i) is operatively coupled to computer device 246; but (ii) not operatively coupled to processor set 204 of triangulation computer 200. In some embodiments, triangulation computer 200 may have one, or more, microphones operatively coupled to it so that it can additionally play the role of a microphone-including computer device. However, it should be noted that some embodiments of the present invention may require that two, or three, or even more microphone-including computer device be used.

An operatively coupled microphone may take one of the following alternative forms: (i) built into the computer device; (ii) a peripheral device that is detachable from the computer device, but which has a fixed position relative to the computer device when attached to the computer device; or (iii) a peripheral device that is detachable from the computer device, is relative unconstrained in its position relative to the computer device when operatively couple with the computer device (for example, mic on end of a cable, Bluetooth connected mic). It is noted that type (iii) microphones may cause certain challenges because it is important, for triangulation purposes, to locate the position of the microphone, and this can potentially become difficult if the microphone is not physically constrained to the computer device in a relatively rigid manner.

In the WANET administered and controlled by mod 302: (i) microphone-including computer devices 246, 247 are connected in a wired manner to triangulation computer 200 through wired communication paths in arms 244a and 244c and signal path 244e; and (ii) microphone-including computer device 245 is connected in a wireless manner by communicating with wireless transceiver 244d. In this embodiment, communications between wireless transceiver 244d and device 245 are made through a Bluetooth type wireless connection. Alternatively, other types of wireless connections (now known or to be developed in the future) may be used for wireless communication links, such as WiFi type wireless connections, near field communication type wireless connection and/or optical connections. (Note: the term(s) "BLUETOOTH" and/or "WiFi" may be subject to trademark rights in various jurisdictions throughout the world and are used here only in reference to the products or services properly denominated by the marks to the extent that such trademark rights may exist.)

With respect to harness device 244, it is noted that many embodiments of the present invention may not include harness device 244, or anything particularly like it. In some embodiments, the capability to communicate data with the WANET-connected devices will be built into triangulation computer 200 (which may itself be a smart phone and which may be considered as one of the microphone-including computer devices in the system, as mentioned above). One pedagogical reason for including harness device 244 in this embodiment is to demonstrate that some embodiments may not use wireless links. In the embodiment under discussion, the sound signals from harness 244 are communicated to triangulation computer 200 through wired communication path 244e (see FIGS. 1A and 1B). Alternatively, this communication path could be implemented as a wireless link of the WANET. As a further alternative, microphone-including computer devices 247, 246 could communicate directly, and wirelessly, with triangulation computer 200 without using any data communication hardware that might be present in harness device 244.

Another pedagogical reason for including harness device 244 in this embodiment is to show the difference between: (i) constrained, located in a predetermined way microphone-including devices; and (ii) unconstrained microphone-including computer devices. In this embodiment: (i) two of the microphone-including computer devices 246, 247 are constrained; and (ii) one microphone-including computer device 245 is free to be moved about in an arbitrary fashion, relative to the virtual touchscreen and/or to the other microphone-including computer devices, during a session of using virtual touchscreen 248. In other embodiments, all of the microphone-including computer devices will be constrained. In still other embodiments, all microphone-including computer devices will be unconstrained—these embodiments have a potential advantage in that little, or no, additional computer hardware (like harness device 244) may be required.

Another pedagogical reason for including harness device 244 in this embodiment is to show that there may, or may not, be some visual indication of the location of the virtual touchscreen to the user. In this case, the virtual touchscreen is indicated by projected light, as is currently conventional. Other embodiments may use other hardware such as a piece of paper or a noise-emitting keyboard (for example, a standard computer keyboard with its cord unconnected). Still other embodiments may not rely on the use of a flat surface to tap on at all (for example, a wand that emits ultrasonic or sub-sonic signals from its tip, sound emitting fingertip pads that allow a computer game to precisely show the position of an avatar's hands in virtual space on two dimensional or three-dimensional display).

Processing proceeds to step S260, where microphone location module 304 of program 300 determines the locations, relative to each other and relative to audio touchscreen 248, of microphones 235, 236 and 237 (see FIG. 1B) of computer devices 245, 246 and 247, respectively, that participate in the ad hoc network of audio touchscreen 248. Because computer devices 246, 247 are positionally constrained with respect to virtual touchscreen 248 by harness device 244, it is relatively easy to determine the positions of their microphones 236, 237 relative to each other and to virtual touchscreen 248. On the other hand, unconstrained device 245 must have its location determined in a way that is not based on an assumption that it has been placed at a predetermined location and oriented in a predetermined orientation. As mentioned above, the processors of the various devices assist in the microphone location process.

This process of locating various microphones is discussed in more detail, below, in the Further Comments And/Or Embodiments sub-section of this Detailed Description section.

At step S260, data for synchronizing the clocks of the various microphone-including computer devices to a common time scale is also determined. In this embodiment, the clocks of devices 245, 246, 247 and the clock of triangulation computer 200 are all closely synchronized to a master clock (not shown) that is distributed over the internet. This means that, at a single moment in time, the time values of all of the clocks in components 200, 245, 246, 247 will be identical. However, in other embodiments, there may be discrepancies as between the clocks of the components. In this case mod 304 determines how to respectively convert, or offset, time readings of the clocks of microphone-including computer devices into a common time scale of the clock of computer 200.

The data sent, over the WANET, from microphone-including computer devices 245, 246, 247 to computer 200 so that the respective clocks can be synchronized (or determined to be synchronized) is considered to be part of the "sound signal" sent from the microphone-including computer devices 245, 246, 247 to triangulation computer 200 because this data is used to do triangulation of sound events (as will be further explained, below). Similarly, the data sent, over the WANET, from microphone-including computer devices 245, 246, 247 to computer 200 so that the microphones of the devices can be located in space is also considered to be part of the "sound signal" sent from the microphone-including computer devices 245, 246, 247 to triangulation computer 200 because this data is used to do triangulation of sound events.

Processing proceeds to step S265, in which a user (not separately shown) triggers a sound event (see definition, below) by tapping a finger onto a portion of virtual touch-screen 248 (see FIG. 1B). The sound from the sound event will travel at a substantially identical speed (that is, the speed of sound given ambient temperature and pressure conditions) to microphones 235, 236, 237. As shown in FIG. 1B, microphone 235 is not placed on tabletop 249 so that it does not pick up sound that has travelled through the solid matter of tabletop 249 because that could affect the time at which the sound event reaches microphone 235 and throw off the triangulation calculations. Similarly, harness device 244 is constructed to substantially sonically isolate microphones 236, 237 from sound transmitted through tabletop 249.

Because the vibrations induced by the sound event travel at constant speed in all directions through the air, and further because the various microphones will not be at the exact same distance from the sound event (in this example, the tap on the tabletop), this means that the sound event will arrive at the three microphones at different times with respect to a common timescale. In this embodiment, these timing differences are the basis of the triangulation calculations that will be performed to locate the location of the sound event.

Processing proceeds to step S270, wherein acoustic energy generated by the sonic event of step S265, and transduced by microphones 235, 236 and 237 and included, in some form, in sound signals generated by the processors of computer devices 245, 246 and 247. In this simple example, the frequency and amplitude of the sound, as transduced by the microphone is not included in the sound signal. Rather, as shown in sound signal diagram 500 of FIG. 5, the sound event is converted into a simple binary signal (low for silence, and 1 for a sound within some predetermined frequency range and above some threshold amplitude). More specifically, the sound event of the tabletop tap (two full clock cycles in duration in this example) is reflected in sound signal portions 504 (corresponding to device 246), 506 (corresponding to device 247) and 508 (corresponding to device 245) respectively by high signal portions 520a, b, c, respectively. As can be seen from signal diagram 500, these sound signal portions are coupled with timescale information from clock signal 502, coupling, or timestamping, represents a timing portion of the sound signals. In this example, only a single clock is shown because all the devices are synchronized to a common clock, as mentioned above. In other embodiments, each sound event may be timestamped according to a different clock, where the various microphone including computer devices are not synchronized to a common clock (but can be synchronized to a common timescale using time information received at step S260. In this way, the sound signals include both time information (timing of the sound) and sound event information (beginning and duration of the sound). In yet other embodiments, transduced signals from the various computer devices are synchronized (after an inaudible negotiation among the computer devices to start the process) by inclusion of inaudible pulses at regular intervals from each device.

Other embodiments may further include frequency and/or amplitude information, as transduced by the microphones, in the sound signal generated by the microphone-including computer device. Where present, this information may be used to: (i) ensure that triangulated sound events really relate to a single identical sound event (for example, the same tap in a quick series of tabletop taps); and/or (ii) to preform triangulation.

At step S270, the sound signals (or, more precisely the portions of the sound signals not previous sent at step S260) are sent through the ad hoc network to triangulation mod 306 of program 300 or triangulation computer 200.

Processing proceeds to step S275, where triangulation module 306 of FIG. 3, including common time-scale sub-module 308, timing differences sub-module 310 and distance justification sub module 312, determine a location of the sound event produced by the tap on the tabletop at step S265. More specifically: (i) sub-mod 308 determines the timing of the sound, from each sound signal, against a common time scale; (ii) sub-mod 310 determines the differences between the timings of the sound as measured against the common time scale; and (iii) distance justification sub-mod 312 performs the geometric and/or trigonometric calculations used to locate the sound by what is commonly known as "triangulation." Each of these three sub-steps will respectively be discussed in the following three paragraphs.

Figure 5:
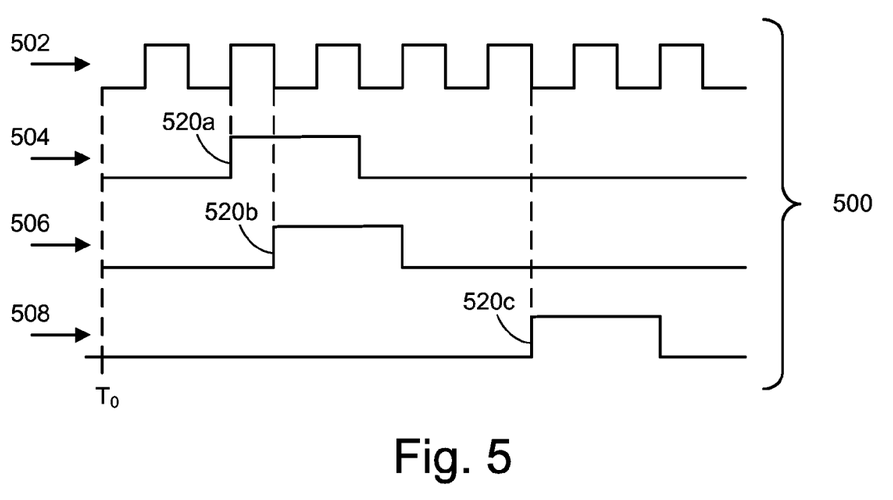
FIG. 5 is a sound signal diagram in a second embodiment of a system according to the present invention.

In this embodiment, it is trivially easy for sub-mod 308 to put all the sound signals on a common timescale because, in this embodiment, it has already been determined, at step S260, that the clocks of all three separate computer devices 245, 246 and 247 have very closely synchronized clocks as shown by clock signal portion 502 of signal diagram 500 of FIG. 5. However, in other embodiments, the fact of separate computer devices putting time stamps on their time signals may mean that sub-mod 308 has to convert timestamps of one, or more, of the sound signals so that they share a common timescale.

Sub-mod 310 matches common sound events present in the sound signals from each microphone-including computer device and determines the differences in transduction time as between each pair of microphones. In this embodiment, there are three microphones so there are three pairwise differences as follows: (i) device 246/247 difference of 0.5 clock cycles (see signal diagram 500 at 520*a*, 520*b*); (ii) device 246/245 difference of 3.5 clock cycles (see signal diagram 500 at 520*a*, 520*c*); and (ii) device 247/245 difference of 3.0 clock cycles (see signal diagram 500 at 520*b*, 520*c*). In this relatively simple embodiment, a sound event is deemed to be transduced at the moment the sound portion of the sound signal rises from binary-low to binary-high. Other embodiments may have more sophisticated common sound event matching and/or time-evaluation schemes, or algorithms, based on more sophisticated sound data (for example, sound data including frequency and/or amplitude information.

Sub-mod 312 performs the triangulation based on the timing differences determined by sub-mod 310. Embodiment(s) or algorithm(s) for doing this are discussed in detail, below, in the Further Comments And/Or Embodiments sub-section of this detailed Description section. While this embodiment under discussion uses only timing differences to perform the triangulation calculations, other embodiments may perform triangulation using, in whole or in part, other features of the transduced sound event such as frequency, amplitude, attack and/or decay.

Processing proceeds to step S280, where user input content module 314 of program 300 determines the content of user input based on the location of the sonic event produced at step S265. For example, if the sound event has been determined to originate within the area of the space bar of a simulated computer keyboard of light projection audio touchscreen 248 projected onto tabletop 249 (see FIG. 1B), then the content of the user input is determined to be the striking of a space bar. This embodiment is limited to a virtual touchscreen keyboard where keys are tapped in a manner similar to tapping done on a conventional, non-virtual-touchscreen keyboard device and in general, an input signal is interpreted as either selection of an alphanumeric character, manipulation of a cursor and/or any other input that can be received from a traditional computer keyboard, mouse or other computer user interface device. Additionally, or alternatively, the sound may correspond to other user gesture types of user input. For example, a series of taps, performed by the user, as the user moves her fingertip along the surface of the tabletop could be used in a similar way to conventional motion type user input received through a conventional mousepad on a conventional laptop. Another example would be a user wearing gloves with ultrasonic vibration transmitters built in so that the user input could correspond to hand motion in three dimensional space, which might then be converted to virtual hand motion in virtual three dimensional space.

Figure 4:
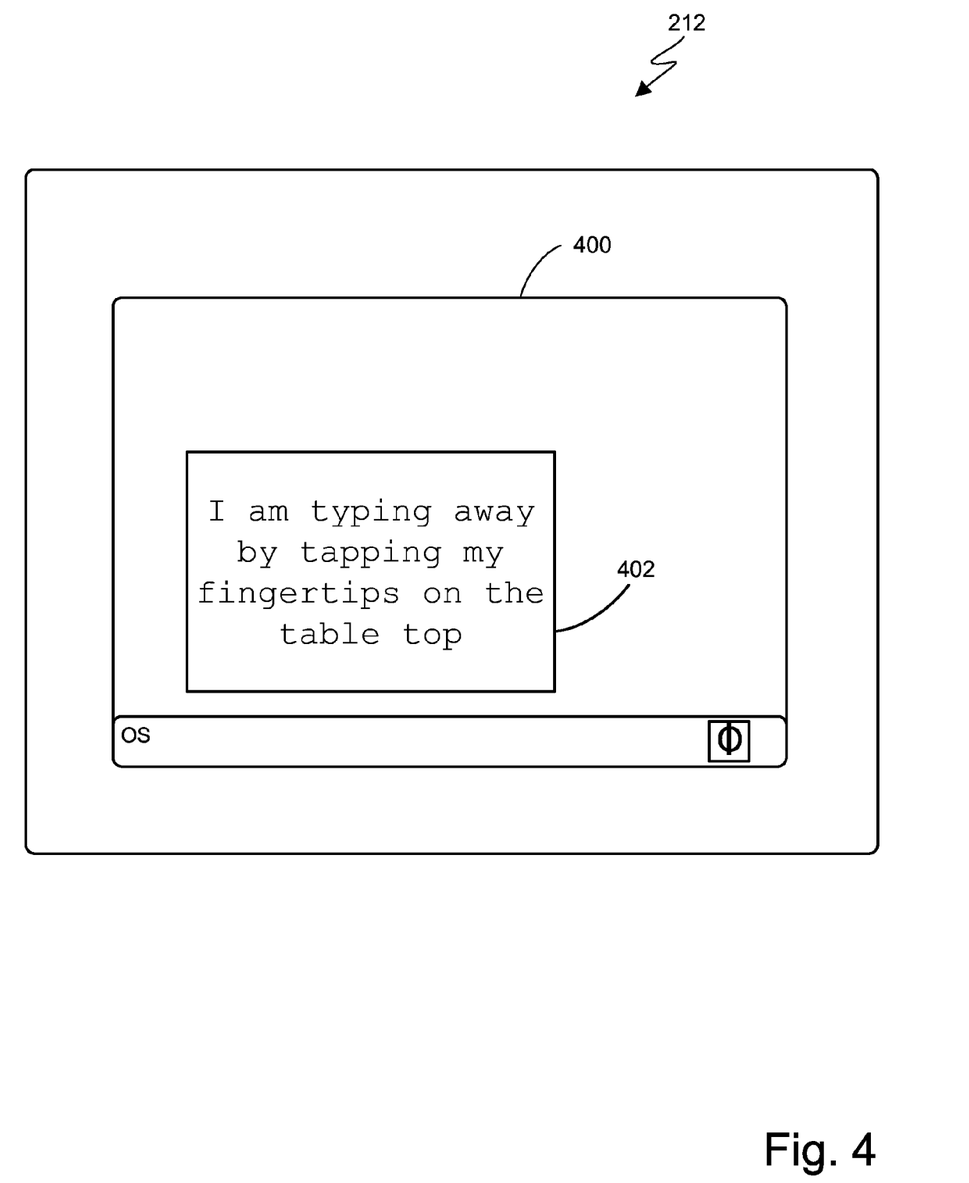
FIG. 4 is a screenshot view generated by the first embodiment system.

Processing proceeds to step S285 where triangulated user input computer 200, of triangulated user input computer system 102 of FIG. 1A, responds to user input determined at step S280. Referring now to FIG. 4, this is shown in typing window 402 of screenshot 400 of display device 212, where the user has performed a series of taps to type a text-based message.

III. Further Comments and/or Embodiments

Some embodiments of the present invention may include one, or more, of the following features, characteristics and/or advantages: (i) implements an audio touchscreen; (ii) leverages sound detected at various locations to pinpoint the location of the sound or vibration source, such as a tap, which then corresponds to an input to a computing device; (iii) can be implemented in existing technologies, for instance in mobile devices and tablets; (iv) can leverage use of the back of a mobile device or tablet for various inputs; (v) provides an ergonomic way for a user to interact with a device by providing inputs on the back of the device; (vi) interfaces with other devices, using for example nearby communications, to increase the number of transducers (also referred to herein as microphones) and/or other sensors, and the amount of data available to triangulate a sound source; (vii) allows a very large area, such as a desk surface, to be used as an audio touchscreen; (viii) links a plurality of cellphones to a target device, such that the cellphones provide input to the target device; (ix) creates a triangulated sound-based method for computer input; (x) augments, and/or provides an alternative to touchscreen, keyboard and/or mouse based computer input; (xi) leverages sound detected by microphones in various positions to pinpoint the location of a tap which would then correspond to an action taken on a computing device; (xii) can be implemented in existing technologies, for example mobile devices and tablets; (xiii) uses of the back of various devices for inputs; (xiv) provides an ergonomic way for a user to interact with a device to provide inputs on the back of the device by using the hand with which they hold the device already wrapped around to the back of the device; (xv) converts a surface, for instance a desktop surface or a wall, into an audio touchscreen, using for example, audio inputs detected by three or more cellphones placed in contact with, and/or in proximity to the surface; (xvi) links a device with two or more cellphones to provide input to the linked device; (xvii) provides an alternative method of computer input besides traditional touchscreen, keyboard and/or mouse; (xviii) creates an audio touchscreen on a mouse pad on which a user uses their hand as a mouse; (xix) recognizes gestures; (xviii) uses inputs from a phone's ambience microphone and input microphone(s); and/or (xx) makes use of other sensors on a mobile device such as infrared sensors, cameras, accelerometers, etc.

In some embodiments of the present invention, a sphere (sometimes herein referred to as a candidate sphere) is a calculated range of distance from the origin of a sound to the center of a transducing element. If two or more transducers each pick up a sound (a waveform input with known strength or pressure) from a point source, it can be deduced that at some distance away from each transducer, the sound was created. For three transducers, three candidate spheres collectively constitute inputs that are used to determine the location of the sound origin. The location of the sound origin in turn is resolved as input to a computing device. Stated differently, a sphere is a radius centered at a transducer which could have encompassed (precisely at some unknown point on the sphere) the origin of a sound that could have produced the detected sound pressure level.

In some embodiments of the present invention, a number of cases can exist between two spheres: (i) they do not overlap (they do not share any common points); (ii) they touch at one point only (they are mutually tangent at a point on both of their surfaces); (iii) they overlap (and share a common circle at the intersection of their surfaces); (iv) one sphere engulfs another (the smaller sphere is entirely within a larger one); and/or (v) they overlap perfectly (their centers are at the same point). Case (i) does not happen unless the microphones are positioned in locations that are ill-placed for use in some embodiments of the present invention. Case (iv) does not normally occur, provided the microphones have substantially the same sensitivity as each other. Case (v) can happen only if the spheres were centered at the same point (that is, from the same microphone). Based on the distances the microphones are positioned relative to the front and back surfaces of a device, the candidate positions are narrowed down. This can be especially useful for detecting touches against the back of a device.

In some embodiments of the present invention, (assuming the devices all have global positioning system (GPS) coordination systems, or similar functional systems), devices (for example, phones) geo-locate with reference to one another by exchanging GPS location strings. Euclidean geometry (triangulation) is used to work out the positions of the devices relative to one another.

In some embodiments of the present invention, triangulation signals are aggregated into a group consensus using general quorum or simple majority. A quorum system prevents what is sometimes called in computing parlance a "split-brain" condition (also referred to as a cluster split, or a partition). In a high availability computing cluster for example, when two halves of the cluster are not in normal communications with each other, nodes in each half of the cluster may simultaneously try to assume control of a resource. If the resource is a traditional file system for example, data and file system corruption can result. A quorum system eliminates a "split-brain" problem since only one half of the cluster at a time is allowed to become the operative half with respect to the resource.

In order to help in understanding the present invention, some systems called "quorum systems" will be described in the following few paragraphs.

In a "master assignment" method used in a quorum system, an administrator predetermines which node or nodes (master node or master nodes) must be present to make services available to clients. A "master assignment" algorithm is a poor choice for a high availability computing environment since loss of the master node(s) is catastrophic. However, "master assignment" provides predictable failure scenarios. "Master assignment" is not generally used in high availability clusters. Advantages of "master assignment" include simplicity. Disadvantages include non-robust failure recovery.

An example of "master assignment" is a set of web servers using a simple network file system (NFS) server to provide data to a set of computers. The computers, in turn, use a web server to provide data to clients. Failure of the NFS server is catastrophic, but failure of the web servers is not, as the data is available via other web servers.

Another quorum system is central arbitration, in which a centralized server or administrator decides whether a quorum exists and, if so, which nodes in a cluster are part of this quorum. This algorithm is highly scalable and can support many nodes. However, the centralized server or administrator can become a bottleneck. For example, if all communication with the centralized server or administrator is lost, a quorum no longer exists and client nodes are not allowed to continue operation. Advantages of central arbitration include simplicity, scalability, and usefulness in disaster recovery situations. Disadvantages include: (i) a centralized server or administrator becomes a bottleneck and/or single point of failure; and/or (ii) central arbitration requires additional hardware and/or manpower to remain operational.

Grand unified lock manager (GULM), which used to be part of global file system (GFS), is an example cluster where central arbitration was used. GFS clients became cluster members if and only if they were in communication with the current GULM master server. To avoid a single point of failure, GULM servers form a cluster of their own, using the simple majority algorithm (see below). The actual GULM master service could fail over.

Yet another quorum system is a "simple majority", an algorithm which is commonly used in computer clusters. In a simple majority quorum system, more than half the nodes in a cluster must be online and in communication with each other for a quorum to exist. Advantages of "simple majority" include: (i) simplicity; (ii) predictable failure recovery; and/or (iii) can sustain any (ceiling(n/2)−1) simultaneous failures without loss of quorum (where n, used here and in the following few paragraphs, is the number of nodes).

Disadvantages of "simple majority" include: (i) requires a majority of hosts (floor(n/2)+1) in the cluster to be online and operating for a quorum to exist; and/or (ii) requires additional "tie-breaking' logic to make two-node clusters work correctly.

Still another quorum system is a "weighted majority" algorithm, an extension of the simple majority algorithm. A "weighted majority" assigns vote(s) to each node and decides quorum based on vote counts from the nodes. As in "simple majority", "weighted majority" requires a majority (floor(n/2)+1) of votes to establish quorum, but the operative item being counted is votes whereas "simple majority" counts nodes.

"Weighted majority" can be configured to emulate other algorithms. For example, by assigning one vote to each node, "weighted majority" emulates a "simple majority" algorithm. By assigning a majority (at least floor(n/2)+1) of votes to one node and 1 (or 0) votes to all other nodes, a "weighted majority" emulates a "master assignment" algorithm. Advantages of "weighted majority" algorithm include its flexibility. A disadvantage of "weighted majority" is that additional "tie-breaking" logic is required to make two-node clusters work correctly.

Some embodiments of the present invention may include one, or more, of the following features, characteristics and/or advantages: (i) creates an audio touchscreen; (ii) creates an ad hoc network out of an array of mobile microphones for spatial triangulation; (iii) performs mobile device audio triangulation; (iv) creates mobile device microphone array touch input; (v) creates a trackpad (also known as a touchpad) based on audio input; (vi) creates a method or system for providing an audio input to a device via triangulation using three or more microphones; (vii) provides audio input to a device (for example, a mobile device, mouse pad, etc.) via sound triangulation using three or more microphones placed in the device; (viii) provides audio input to a device via spatial triangulation using three or more microphones or devices having microphones; (ix) provides an audio input to a device via sound triangulation using three or more devices having microphones; and/or (x) uses an array of microphones to synthesize a touch input on an arbitrary surface.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar caveats apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Ceiling(x): the smallest integer not less than x.

Floor(x): the largest integer not greater than x.

Sound: sonic vibrations having a frequency and/or amplitude such that humans can generally hear the vibrations through the sense of hearing.

Sonic: Sound, sub-sonic and/or ultrasonic vibrations.

Sonic event: Any event that produces sonic vibrations; a sonic event that produces "sound" (see definition) is herein referred to as a "sound event."

Sonic signal: Includes at least information that a sonic event has occurred and the time of the sonic event as measured against a clock.

Timestamp: any data indicating the timing of a sonic event against a computer based clock.

Microphone: any device that transduces the vibrations produced by a sonic event into a data signal (for example, electrical signal, optical signal).

What is claimed is:

1. A method comprising:
   determining, by one or more processors, a quorum from a plurality of computer devices for participation in a wireless audio touchscreen implementation, where each computer device of the plurality of computer devices includes at least one microphone, a computer readable media storage module, a processing module, microphone location data including information indicative of a location of the microphone relative to the computer device it is physically connected to, computer device location data indicative of where the computer device is located, and a computer generated clock processed by the processing module and stored on the computer readable media storage module;
   synchronizing, by the one or more processors, the computer generated clock of each computer device of the quorum of the plurality of computer devices to a common time-scale;
   from each computer device of the quorum of the plurality of computer devices, receiving, by the one or more processors, a sonic signal corresponding to a sonic event transduced by the microphone of the computer device, where each sonic signal includes time data providing information indicative of a time that the computer device detected the sonic event based, at least in part, on the computer generated clock of the computer device;
   triangulating, by the one or more processors, a location of a source of the sonic event based, at least in part, on the plurality of sonic signals, the microphone location data and the computer device location data of each computer device of the quorum; and
   generating, by the one or more processors, a user input data based at least in part on the location of the source of the sonic event as determined by the triangulation.

2. The method of claim 1, wherein the quorum is one of: (i) a simple majority, or (ii) a weighted majority.

3. The method of claim 1 further wherein the computer device location data and microphone location data is determined, at least in part, on an orientation and global position determined by an accelerometer and global positioning system (G.P.S.) sensor integrated into the computer device.

4. The method of claim 1 wherein each sonic signal of the plurality of sonic signals additionally includes data indicative of the following characteristics of the sonic event: (i) frequency, (ii) amplitude, (iii) attack, and (iv) decay.

5. The method of claim 1 wherein the microphone converts detected sonic events into binary signals, with 0 indicating no sonic event above a predetermined amplitude value and within a predetermined frequency range, and 1 indicating a sonic event was detected at or above the predetermined amplitude value and between the predetermined frequency range.

6. A computer program product comprising:
   a non-transitory machine readable storage device; and
   computer code stored on the non-transitory machine readable storage device, with the computer code including instructions for causing a processor(s) set to perform operations including the following:
      determining, by one or more processors, a quorum from a plurality of computer devices for participation in a wireless audio touchscreen implementation, where each computer device of the plurality of computer devices includes at least one microphone, a computer readable media storage module, a processing module, microphone location data including information indicative of a location of the microphone relative to the computer device it is physically connected to, computer device location data indicative of where the computer device is located, and a computer generated clock processed by the processing module and stored on the computer readable media storage module;
      synchronizing, by the one or more processors, the computer generated clock of each computer device of the quorum of the plurality of computer devices to a common time-scale;
      from each computer device of the quorum of the plurality of computer devices, receiving, by the one or more processors, a sonic signal corresponding to a sonic event transduced by the microphone of the computer device, where each sonic signal includes time data providing information indicative of a time that the computer device detected the sonic event based, at least in part, on the computer generated clock of the computer device;

triangulating, by the one or more processors, a location of a source of the sonic event based, at least in part, on the plurality of sonic signals, the microphone location data and the computer device location data of each computer device of the quorum; and generating, by the one or more processors, a user input data based at least in part on the location of the source of the sonic event as determined by the triangulation.

7. The product of claim 6, wherein the quorum is one of: (i) a simple majority, or (ii) a weighted majority.

8. The product of claim 6 further wherein the computer device location data and microphone location data is determined, at least in part, on an orientation and global position determined by an accelerometer and global positioning system (G.P.S.) sensor integrated into the computer device.

9. The product of claim 6 wherein each sonic signal of the plurality of sonic signals additionally includes data indicative of the following characteristics of the sonic event: (i) frequency, (ii) amplitude, (iii) attack, and (iv) decay.

10. The product of claim 6 wherein the microphone converts detected sonic events into binary signals, with 0 indicating no sonic event above a predetermined amplitude value and within a predetermined frequency range, and 1 indicating a sonic event was detected at or above the predetermined amplitude value and between the predetermined frequency range.

11. A computer system comprising:
a processor(s) set;
a machine readable storage device; and
computer code stored on the machine readable storage device, with the computer code including instructions for causing the processor(s) set to perform operations including the following:
determining, by one or more processors, a quorum from a plurality of computer devices for participation in a wireless audio touchscreen implementation, where each computer device of the plurality of computer devices includes at least one microphone, a computer readable media storage module, a processing module, microphone location data including information indicative of a location of the microphone relative to the computer device it is physically connected to, computer device location data indicative of where the computer device is located, and a computer generated clock processed by the processing module and stored on the computer readable media storage module;

synchronizing, by the one or more processors, the computer generated clock of each computer device of the quorum of the plurality of computer devices to a common time-scale;

from each computer device of the quorum of the plurality of computer devices, receiving, by the one or more processors, a sonic signal corresponding to a sonic event transduced by the microphone of the computer device, where each sonic signal includes time data providing information indicative of a time that the computer device detected the sonic event based, at least in part, on the computer generated clock of the computer device;

triangulating, by the one or more processors, a location of a source of the sonic event based, at least in part, on the plurality of sonic signals, the microphone location data and the computer device location data of each computer device of the quorum; and generating, by the one or more processors, a user input data based at least in part on the location of the source of the sonic event as determined by the triangulation.

12. The system of claim 11, wherein the quorum is one of: (i) a simple majority, or (ii) a weighted majority.

13. The system of claim 11 further wherein the computer device location data and microphone location data is determined, at least in part, on an orientation and global position determined by an accelerometer and global positioning system (G.P.S.) sensor integrated into the computer device.

14. The system of claim 11 wherein each sonic signal of the plurality of sonic signals additionally includes data indicative of the following characteristics of the sonic event: (i) frequency, (ii) amplitude, (iii) attack, and (iv) decay.

15. The system of claim 11 wherein the microphone converts detected sonic events into binary signals, with 0 indicating no sonic event above a predetermined amplitude value and within a predetermined frequency range, and 1 indicating a sonic event was detected at or above the predetermined amplitude value and between the predetermined frequency range.

* * * * *